(12) United States Patent
Farrington et al.

(10) Patent No.: US 6,188,586 B1
(45) Date of Patent: Feb. 13, 2001

(54) ASYMMETRICAL HALF-BRIDGE POWER CONVERTER HAVING REDUCED INPUT RIPPLE AND METHOD OF MANUFACTURING THE SAME

(75) Inventors: Richard Farrington, Rockwall; Mark E. Jacobs, Dallas; Rui Liu; Vijayan J. Thottuvelil, both of Plano, all of TX (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/553,824

(22) Filed: Apr. 21, 2000

(51) Int. Cl.[7] .................................................. H02M 3/335
(52) U.S. Cl. ................................. 363/17; 363/40
(58) Field of Search .................. 363/16, 17, 39, 363/40, 41, 131, 132

(56) References Cited

U.S. PATENT DOCUMENTS 6,064,580 * 5/2000 Watanabe et al. ..................... 363/17
6,091,610 * 7/2000 Garcia et al. .......................... 363/17

* cited by examiner

*Primary Examiner*—Peter S. Wong
*Assistant Examiner*—Gary L. Laxton

(57) ABSTRACT

An asymmetrical half-bridge power converter and a method of manufacturing the same. In one embodiment, the asymmetrical half-bridge power converter includes: (1) first and second power switches configured to be controlled by complementary drive signals having nominal first and second duty cycles of D and 1-D, respectively and (2) first and second capacitors, having intrinsic capacitance values proportional to 1-D and D, respectively, and intrinsic equivalent series resistance (ESR) values proportional to D and 1-D, respectively, configured to reduce input ripple current associated with the asymmetrical half-bridge power converter.

20 Claims, 2 Drawing Sheets

ASYMMETRICAL HALF-BRIDGE POWER CONVERTER HAVING REDUCED INPUT RIPPLE AND METHOD OF MANUFACTURING THE SAME

TECHNICAL FIELD OF THE INVENTION

The present invention is directed, in general, to power conversion and, more specifically, to an asymmetrical half-bridge power converter having reduced input ripple and a method of manufacturing the asymmetrical half-bridge power converter.

BACKGROUND OF THE INVENTION

The development of high-efficiency power supplies in combination with a requirement of higher power density is a continuing goal in the field of power electronics. A switched-mode power converter is a frequently employed component of a power supply that converts an input voltage waveform into a specified output voltage waveform. There are several types of switched-mode power converters including, for instance, an asymmetrical half-bridge power converter.

A conventional asymmetrical half-bridge power converter includes two power switches coupled to a control circuit, at least one input/output isolation transformer, a voltage balancing capacitor, a rectifier and a filter. The asymmetrical half-bridge power converter generally operates as follows. The first and second power switches conduct current in a complimentary manner, with generally unequal duty cycles, to convert an input DC voltage into an AC voltage to be applied across the isolation transformer. Any DC component of the voltage applied to a primary winding of the isolation transformer is blocked by the voltage balancing capacitor coupled in series with the primary winding of the isolation transformer. The rectifier then rectifies a secondary voltage from the isolation transformer and the filter smooths and filters the rectified voltage to develop an output voltage for delivery to a load. The control circuit monitors the output voltage of the asymmetrical half-bridge power converter and adjusts the duty cycle of the power switches to ultimately control the output voltage. The output voltage may be maintained at a relatively constant level despite relative fluctuations in the input voltage and the load.

The asymmetrical half-bridge power converter is a well known power circuit topology. The input current to a conventional asymmetrical half-bridge power converter is a discontinuous waveform that can create noise problems. The noise problems often require substantial filtering to meet specifications for conducted and radiated noise from the power converter.

Part of this discontinuity in the input current waveform occurs due to currents in various magnetizing and output inductances being switched by the first and second power switches, thereby generating AC components in the input current. In addition, the output current reflected to the primary winding and alternately switched by the first and second power switches generates a significant component of the input ripple current. To address the potentially deleterious input current ripple, a magnetizing inductance of the transformer may be made larger by minimally gapping the transformer core, consistent with the requirement to prevent core saturation by a DC component of the magnetizing flux. Additionally, an output inductor may be made as large as practical, consistent with design trade-offs. Although helpful, attention to these considerations does not sufficiently reduce the input ripple current.

The input ripple current also varies in magnitude as a function of the duty cycles of the power switches. At a duty cycle of 50 percent, the input ripple current is typically at a minimum, and is primarily composed of the switched current in the transformer magnetizing inductance. However, the asymmetrical half-bridge power converter (and many other types of power converters) is not typically operated at a 50 percent duty cycle, thereby resulting in input ripple currents that are higher than desired.

Accordingly, what is needed in the art is an improved way to reduce input ripple current in an asymmetrical half-bridge power converter.

SUMMARY OF THE INVENTION

To address the above-discussed deficiencies of the prior art, the present invention provides an asymmetrical half-bridge power converter and a method of manufacturing the same. In one embodiment, the asymmetrical half-bridge power converter includes: (1) first and second power switches configured to be controlled by complementary drive signals having nominal first and second duty cycles of D and 1-D, respectively and (2) first and second capacitors, having intrinsic capacitance values proportional to 1-D and D, respectively, and intrinsic equivalent series resistance (ESR) values proportional to D and 1-D, respectively, configured to reduce input ripple current associated with the asymmetrical half-bridge power converter.

The present invention introduces, in one aspect, the broad concept of selecting the capacitance and ESR values of the first and second capacitors of the asymmetrical half-bridge power converter such that they relate to the duty cycle of the complementary first and second drive signals that control the power switches. Those skilled in the pertinent art understand that ESR characterizes the intrinsic resistance of a capacitor and, in the context used herein, includes resistance in the circuit providing the interconnection with the capacitor. The ESR is considered to be in series with the capacitance of the capacitor. Once optimized, these values allow input ripple current to be reduced, even if the duty cycle of the complementary drive signals vary from their nominal values.

In one embodiment of the present invention, at least one external resistor is added to at least one of the first and second capacitors such that the total series resistance of each of the first and second capacitors is proportional to D and 1-D, respectively. In some cases, the ESR of the first and second capacitors cannot be selected to be equivalent to D and 1-D, respectively. In such cases, it may be advantageous to employ one or more external resistors to supplement the ESR of the first and second capacitors.

In a related embodiment of the present invention, a voltage across the external resistor is employable to sense conduction of the first and second power switches. In another embodiment, a voltage across the external resistor is signed and scaled to be indicative of a direction and magnitude of current in the first and second power switches. The use of the voltage across the external resistor to sense the current in the first and second switches avoids the need to provide a separate current sensing process, which often necessitates the use of a current sensing transformer.

In one embodiment of the present invention, first and second R-C time constants of the first and second capacitors are equivalent. The equivalency of the R-C time constants of the first and second capacitors forms a fundamental principle for the reduction of input ripple current in asymmetrical half-bridge power converters.

In one embodiment of the present invention, the complementary drive signals vary from the nominal duty cycles.

The complementary drive signals may vary depending on changes in either the input voltage or the load. In either case, the intrinsic capacitance values and ESR values continue to cooperate to advantageously reduce input ripple current.

In one embodiment of the present invention, the asymmetrical half-bridge power converter includes an isolation transformer. The first and second power switches are configured to alternately switch to apply power from an input of the asymmetrical half-bridge power converter to the isolation transformer. The isolation transformer advantageously provides isolation between the input and the output of the asymmetrical half-bridge power converter.

In one embodiment of the present invention, the asymmetrical half-bridge power converter includes a controller, coupled to the first and second power switches, configured to provide the complementary drive signals to the first and second power switches. The controller operates the first and second power switches to regulate the output voltage of the asymmetrical half-bridge power converter.

In one embodiment of the present invention, the asymmetrical half-bridge power converter includes a rectifier coupled across an output of the asymmetrical half-bridge power converter. The rectifier is configured to provide a rectified output voltage at the output. Those skilled in the pertinent art are familiar with a variety of rectifier topologies.

In one embodiment of the present invention, the asymmetrical half-bridge power converter includes an output filter coupled to an output of the asymmetrical half-bridge power converter. The output filter is configured to smooth the output current to the load. Those skilled in the art are familiar with output filters.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction wit the accompanying drawings, in which.

DETAILED DESCRIPTION

Figure 1:
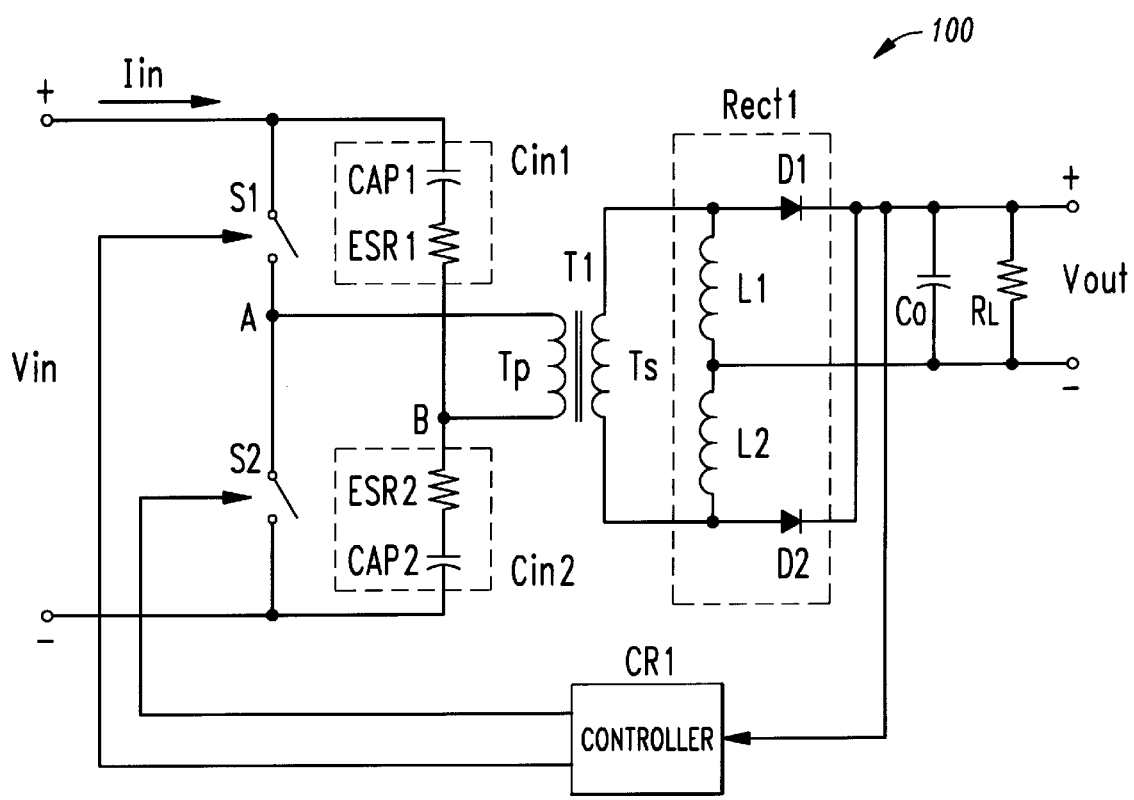
FIG. 1 illustrates a schematic diagram of an embodiment of an asymmetrical half-bridge power converter constructed according to the principles of the present invention.

Referring initially to FIG. 1, illustrated is a schematic diagram of an embodiment of an asymmetrical half-bridge power converter 100 constructed according to the principles of the present invention. The asymmetrical half-bridge power converter 100 includes an input connected to an input voltage Vin. The asymmetrical half-bridge power converter 100 further includes first and second power switches S1, S2 and first and second capacitors Cin1, Cin2 coupled across the input. The first capacitor Cin1 includes a first intrinsic capacitance CAP1 and a first intrinsic equivalent series resistance ESR1. The second capacitor Cin2 includes a second intrinsic capacitance CAP2 and a second intrinsic equivalent series resistance ESR2. The asymmetrical half-bridge power converter 100 further includes a primary winding Tp of an isolation transformer T1 coupled to a first node A between first and second power switches S1, S2 and a second node B between the first and second capacitors Cin1, Cin2.

The asymmetrical half-bridge power converter 100 further includes first and second inductors L1, L2 coupled across a secondary winding Ts of the isolation transformer T1. The asymmetrical half-bridge power converter 100 further includes first and second diodes D1, D2, and an output capacitor Co coupled across output of the asymmetrical half-bridge power converter 100. The asymmetrical half-bridge power converter 100 provides power to a load (designated by a load resistor RL) coupled to the output. The first and second inductors L1, L2, in conjunction with the first and second diodes D1, D2, form a hybridge or current doubler rectifier Rect1. The asymmetrical half-bridge power converter 100 provides an output voltage Vout at the output. The asymmetrical half-bridge power converter 100 still further includes a controller CR1 that provides drive signals to the first and second power switches S1, S2.

The first and second power switches S1, S2 of the asymmetrical half-bridge power converter 100 alternately connect the input voltage Vin to the primary winding Tp thereby developing an AC voltage across the isolation transformer T1. The controller CR1 monitors the output voltage Vout and controls a duty cycle of the first and second power switches S1, S2 to maintain the output voltage Vout at a desired value. The secondary winding Ts then delivers this transformed AC voltage to the rectifier Rect1 wherein it is rectified. The first and second inductors L1, L2, coupled across the secondary winding Ts, effectively double a secondary current in the isolation transformer T1. This rectified and doubled secondary transformer current is filtered and smoothed by the output capacitor Co and delivered to the load RL as the output voltage Vout.

In the illustrated embodiment, the first and second power switches S1, S2 are controlled by complementary drive signals from the controller CR1 having nominal first and second duty cycles of D and 1-D, respectively. During a first portion D of the duty cycle, the first power switch S1 is closed and the second power switch S2 is open. During a second portion 1-D of the duty cycle, the first power switch S1 is open and the second power switch S2 is closed. Typically, the first and second portions D, 1-D of the duty cycle are not equal in value, which allows the output voltage Vout to be adequately regulated for a variation in either the input voltage Vin or the output load RL.

Unequal values of D and 1-D would cause an input current I in to the asymmetrical half-bridge power converter 100 to have an undesirable ripple current component, if not for a judicious selection of the first and second capacitors Cin1, Cin2. In the illustrated embodiment, the first and second capacitors Cin1, Cin2 have been selected to have first and second intrinsic capacitance values CAP1, CAP2 that are respectively proportional to 1-D and D. Additionally, the first and second capacitors Cin1, Cin2 have been selected to have values of first and second intrinsic equivalent series resistances ESR1, ESR2 that are proportional to D and 1-D, respectively.

These first and second intrinsic capacitance values CAP1, CAP2 and their respective equivalent series resistance values ESR1, ESR2 allow the first and second capacitors C1, C2 to cooperate to reduce the input ripple current associated with the asymmetrical half-bridge power converter 100. In the illustrated embodiment of the present invention, first and second R-C time constants of the first and second capacitors Cin1, Cin2 are equivalent. The equivalency of the R-C time constants of the first and second capacitors Cin1, Cin2 forms a fundamental principle for the reduction of input ripple current in the asymmetrical half-bridge power converter 100. Even if the complementary drive signals vary from the nominal duty cycles of D and 1-D for which the first and second capacitors Cin1, Cin2 were selected, the values of first and second intrinsic capacitances CAP1, CAP2 and their associated intrinsic equivalent series resistances ESR1, ESR2 advantageously allow the first and second capacitors C1, C2 to continue to reduce input ripple current.

Figure 2:
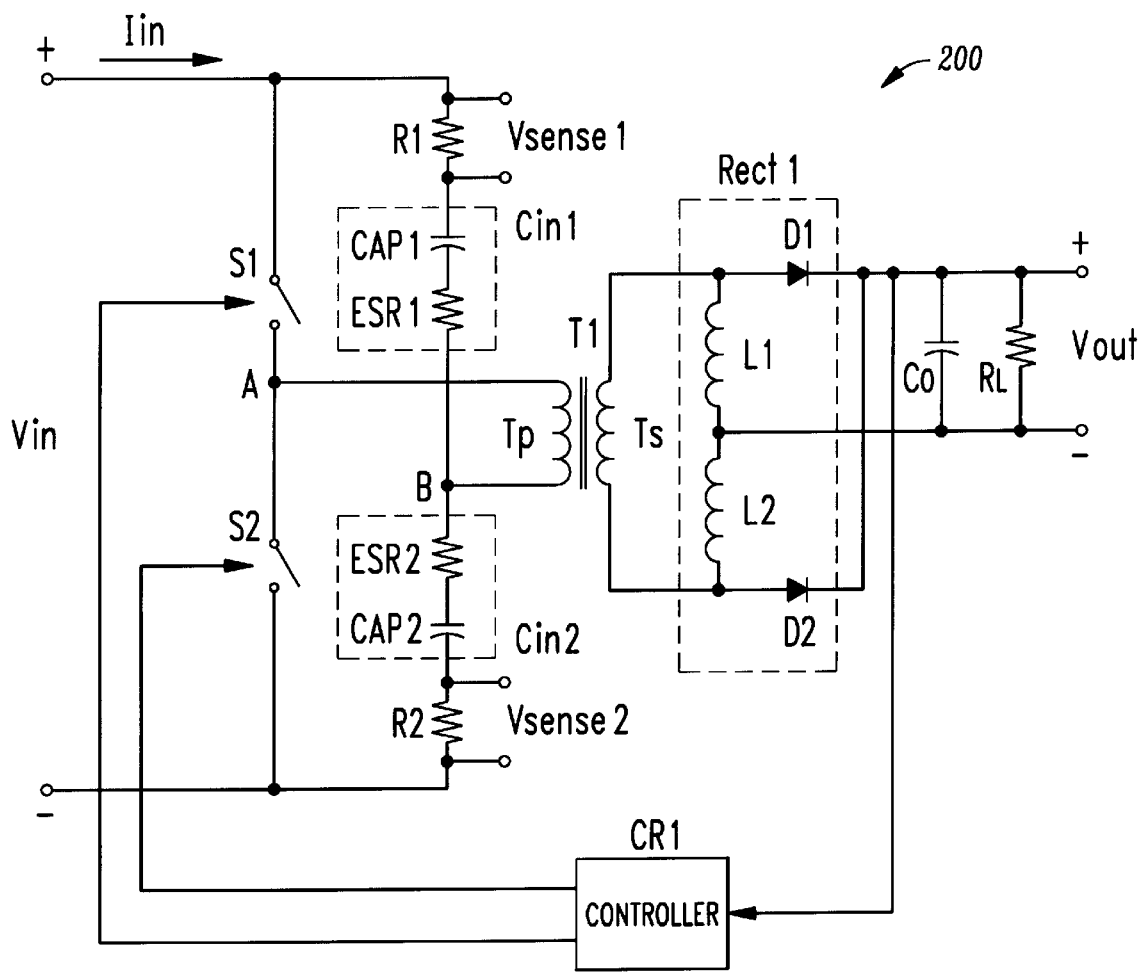
FIG. 2 illustrates a schematic diagram of another embodiment of an asymmetrical half-bridge power converter constructed according to the principles of the present invention.

Turning now to FIG. 2, illustrated is a schematic diagram of another embodiment of an asymmetrical half-bridge power converter 200 constructed according to the principles of the present invention. The asymmetrical half-bridge power converter 200 has an input connected to an input voltage Vin and includes first and second power switches S1, S2 coupled across the input. The asymmetrical half-bridge power converter 200 further includes a series-coupled first capacitor Cin1 and first resistor R1 and a series-coupled second capacitor Cin2 and second resistor R2 coupled across the input. The first capacitor Cin1 includes a first intrinsic capacitance CAP1 and a first intrinsic equivalent series resistance ESR1. The second capacitor Cin2 includes a second intrinsic capacitance CAP2 and a second intrinsic equivalent resistance ESR2. The asymmetrical half-bridge power converter 200 further includes a primary winding Tp of an isolation transformer T1 coupled to a first node A between first and second power switches S1, S2 and a second node B between the first and second series-coupled capacitors Cin1, Cin2 and resistors R1, R2.

The asymmetrical half-bridge power converter 200 further includes first and second inductors L1, L2 coupled across a secondary winding Ts of the isolation transformer T1. The asymmetrical half-bridge power converter 200 further includes first and second diodes D1, D2, and an output capacitor Co coupled across an output of the asymmetrical half-bridge power converter 200. The asymmetrical half-bridge power converter 200 provides power to a load (designated by a load resistor RL) coupled across the output. The first and second inductors L1, L2 and the first and second diodes D1, D2 form a hybridge rectifier Rect1. Of course, other rectifier topologies are well within the broad scope of the present invention. The asymmetrical half-bridge power converter 200 provides an output voltage Vout at the output. The asymmetrical half-bridge power converter 200 still further includes a controller CR1 that provides drive signals to the first and second power switches S1, S2.

Similarly to the asymmetrical half-bridge power converter 100 of FIG. 1, the first and second power switches S1, S2 of the asymmetrical half-bridge power converter 200 are controlled by the controller CR1 to alternately connect the input voltage Vin to the primary winding Tp thereby developing an AC voltage across the isolation transformer T1. The secondary winding Ts delivers this transformed AC voltage to the rectifier Rect1 formed by the first and second diodes D1, D2, wherein it is rectified. The first and second inductors L1, L2, coupled across the secondary winding Ts, effectively double the secondary current of the isolation transformer T1. This rectified and doubled secondary transformer current is filtered and smoothed by the output capacitor Co and delivered to the load RL as the output voltage Vout.

In the illustrated embodiment, the first and second resistors R1, R2 are external resistors that have been coupled in series with the first and second capacitors Cin1, Cin2, respectively. This addition allows the first and second capacitors Cin1, Cin2 to be selected for the appropriate values of the first and second intrinsic capacitance CAP1, CAP2 needed to be respectively proportional to 1-D and D. Then, values of the first and second resistors R1, R2 are selected such that the sum of the first resistor R1 and the first intrinsic equivalent series resistance ESR1 forms a total first series resistance that is proportional to D and the sum of the second resistor R2 and the second intrinsic equivalent series resistor ESR2 forms a total second series resistance that is proportional to 1-D. Of course, in some applications, only one of the external series resistor (R1 or R2) needs to be added to the lowest value of the intrinsic equivalent series resistance (ESR1 or ESR2) to achieve the required proportionality ratios. However, the addition of both the first and second resistors R1, R2 may make the proportionality ratios easier to achieve.

In the illustrated embodiment, a first sense voltage Vsense1 across the first resistor R1 or a second sense voltage Vsense2 across the second resistor R2 may be employed to sense the conduction of the first and second power switches S1, S2, respectively. For example, the first sense voltage Vsense1 is employed to indicate that one of the first and second power switches S1, S2 is conducting. Additionally, the first or second sense voltage Vsense1, Vsense2 may also be signed and scaled to indicate of a direction and magnitude of current in the first and second power switches S1, S2. The direction and magnitude of the current in the first and second power switches S1, S2 may be advantageously employed by the controller CR1 when operating in a current mode of control.

In summary, the present invention has introduced the broad concept of selecting the capacitance and equivalent series resistance values of the first and second capacitors of an asymmetrical half-bridge power converter such that they relate to the duty cycle of the complementary drive signals that control the power switches. Accordingly, adjusting these values such that the R-C time constants associated with the first and second capacitors, either by capacitor selection alone or by appropriate addition of series resistance, greatly reduces the input ripple current. This is also true even if the duty cycle of the complementary drive signals vary somewhat from their nominal values, once the associated R-C time constants are made equivalent at their nominal values.

For a better understanding of power converters, see *Power Electronics: Converters, Applications and Design*, by Ned Mohan, Tore M. Undeland and William P. Robbins, published by John Wiley and Sons (1989) and *Principles of Power Electronics*, by John G. Kassakian, Martin F. Schlecht and George C. Verghese, published by Addison-Wesley Publishing Company (1991), which are incorporated herein by reference in their entirety.

Those skilled in the art should understand that the previously described embodiments of the asymmetrical half-bridge power converter and method of manufacturing the power converter are submitted for illustrative purposes only and other embodiments capable of reducing input ripple current associated with the power converter are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa.

Therefore, although the present invention has been described in detail, those skilled in the art understand that other various changes, substitutions and alterations can be made herein without departing from the spirit and scope of the invention in its broadest form.

What is claimed is:

1. An asymmetrical half-bridge power converter, comprising:

first and second power switches configured to be controlled by complementary drive signals having expected first and second duty cycles of D and 1-D, respectively; and first and second capacitors, having intrinsic capacitance values substantially proportional to 1-D and D, respectively, and intrinsic equivalent series resistance (ESR) values substantially proportional to D and 1-D, respectively, configured to reduce input ripple current associated with said asymmetrical half-bridge power converter.

2. The asymmetrical half-bridge power converter as recited in claim 1 further comprising at least one external resistor series-coupled to at least one of said first and second capacitors such that a total series resistance of each of said first and second capacitors is substantially proportional to D and 1-D, respectively.

3. The asymmetrical half-bridge power converter as recited in claim 2 wherein a voltage across said at least one external resistor is employable to sense a conduction of said first and second power switches.

4. The asymmetrical half-bridge power converter as recited in claim 2 wherein a voltage across said at least one external resistor is signed and scaled to be indicative of a direction and magnitude of current in said first and second power switches.

5. The asymmetrical half-bridge power converter as recited in claim 1 wherein first and second R-C time constants of said first and second capacitors are equivalent.

6. The asymmetrical half-bridge power converter as recited in claim 1 wherein said complementary drive signals vary from said expected duty cycles.

7. The asymmetrical half-bridge power converter as recited in claim 1 further comprising an isolation transformer, said first and second power switches configured to alternately switch to apply power from an input of said asymmetrical half-bridge power converter to said isolation transformer.

8. The asymmetrical half-bridge power converter as recited in claim 1 further comprising a controller, coupled to said first and second power switches, configured to provide said complementary drive signals thereto.

9. The asymmetrical half-bridge power converter as recited in claim 1 further comprising a rectifier, coupled across an output of said asymmetrical half-bridge power converter, configured to provide a rectified output voltage at said output.

10. The asymmetrical half-bridge power converter as recited in claim 1 further comprising an output filter coupled to an output of said asymmetrical half-bridge power converter.

11. A method of manufacturing an asymmetrical half-bridge power converter, comprising:

providing first and second power switches configured to be controlled by complementary drive signals having expected first and second duty cycles of D and 1-D, respectively; and providing first and second capacitors having intrinsic capacitance values substantially proportional to 1-D and D, respectively, and intrinsic equivalent series resistance (ESR) values substantially proportional to D and 1-D, respectively, said first and second capacitors configured to reduce input ripple current associated with said asymmetrical half-bridge power converter.

12. The method as recited in claim 11 further comprising series-coupling at least one external resistor to at least one of said first and second capacitors such that a total series resistance of each of said first and second capacitors is substantially proportional to D and 1-D, respectively.

13. The method as recited in claim 12 wherein a voltage across said at least one external resistor is employable to sense a conduction of said first and second power switches.

14. The method as recited in claim 12 wherein a voltage across said at least one external resistor is signed and scaled to be indicative of a direction and magnitude of current in said first and second power switches.

15. The method as recited in claim 11 wherein first and second R-C time constants of said first and second capacitors are equivalent.

16. The method as recited in claim 11 wherein said complementary drive signals vary from said expected duty cycles.

17. The method as recited in claim 11 further comprising providing an isolation transformer, said first and second power switches configured to alternately switch to apply power from an input of said asymmetrical half-bridge power converter to said isolation transformer.

18. The method as recited in claim 11 further comprising coupling a controller to said first and second power switches, said controller configured to provide said complementary drive signals thereto.

19. The method as recited in claim 11 further comprising coupling a rectifier across an output of said asymmetrical half-bridge power converter, said rectifier configured to provide a rectified output voltage at said output.

20. The method as recited in claim 11 further comprising coupling an output filter to an output of said asymmetrical half-bridge power converter.

* * * * *